United States Patent
Rijsman et al.

(10) Patent No.: US 9,596,318 B2
(45) Date of Patent: *Mar. 14, 2017

(54) DYNAMIC NETWORK DEVICE PROCESSING USING EXTERNAL COMPONENTS

(71) Applicant: Juniper Networks, Inc., Sunnyvale, CA (US)

(72) Inventors: Bruno Rijsman, Sunnyvale, CA (US); Usha Sharma, Fremont, CA (US); Prabhakaran Ganesan, Fremont, CA (US); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,552

(22) Filed: Feb. 3, 2016

(65) Prior Publication Data
US 2016/0156735 A1   Jun. 2, 2016

Related U.S. Application Data

(63) Continuation of application No. 14/617,384, filed on Feb. 9, 2015, now Pat. No. 9,258,384, which is a
(Continued)

(51) Int. Cl.
*H04L 29/08* (2006.01)
*H04L 12/851* (2013.01)
*G06F 9/455* (2006.01)

(52) U.S. Cl.
CPC ......... *H04L 67/32* (2013.01); *G06F 9/45558* (2013.01); *H04L 47/2408* (2013.01); *H04L 67/02* (2013.01); *G06F 2009/45595* (2013.01)

(58) Field of Classification Search
USPC ........................................ 709/217, 200, 238
See application file for complete search history.

(56) References Cited

U.S. PATENT DOCUMENTS

| 6,539,026 B1 | 3/2003 | Waclawsky |
| 6,651,067 B1 * | 11/2003 | Gorelik ............. G06F 17/30554 707/803 |

(Continued)

FOREIGN PATENT DOCUMENTS

EP    2 533 480 A1    12/2012

OTHER PUBLICATIONS

Extended European Search Report corresponding to EP 13 19 9820.5 mailed Mar. 31, 2014, 5 pages.
(Continued)

*Primary Examiner* — Jude Jean Gilles
(74) *Attorney, Agent, or Firm* — Harrity & Harrity, LLP

(57) ABSTRACT

A network device may receive information regarding a service set identifying service to apply to a data flow received via a particular interface of the network device; receive the data flow via the particular interface; identify a service to provide to the data flow based on the information regarding the service set; identify a processing device to process the data flow; and provide the data flow to the processing device. The processing device may be different than the network device and may process the data flow, on behalf of the network device, to form a processed data flow. The processed data flow may include the data flow with the service applied to the data flow. The network device may further receive the processed data flow from the processing device and transmit the processed data flow toward a destination device.

20 Claims, 10 Drawing Sheets

Related U.S. Application Data continuation of application No. 13/740,781, filed on Jan. 14, 2013, now Pat. No. 8,954,535.

(60) Provisional application No. 61/747,930, filed on Dec. 31, 2012.

(56) References Cited

U.S. PATENT DOCUMENTS

| | | | |
|---|---|---|---|
| 6,651,142 B1 * | 11/2003 | Gorelik | G06F 17/30902 707/E17.12 |
| 7,363,353 B2 | 4/2008 | Ganesan et al. | |
| 7,529,563 B1 * | 5/2009 | Pitroda | G06Q 20/02 455/406 |
| 7,551,303 B2 * | 6/2009 | Hikawa | H04N 1/00209 358/1.13 |
| 7,742,406 B1 | 6/2010 | Muppala | |
| 7,813,352 B2 | 10/2010 | Riddle et al. | |
| 7,843,843 B1 | 11/2010 | Papp et al. | |
| 7,881,215 B1 | 2/2011 | Daigle et al. | |
| 8,042,041 B1 * | 10/2011 | Fenn | H04L 29/08729 715/251 |
| 8,954,535 B2 * | 2/2015 | Rijsman | H04L 47/2408 370/230 |
| 9,055,023 B2 | 6/2015 | Murphy | |
| 9,258,384 B2 * | 2/2016 | Rijsman | H04L 47/2408 |
| 2005/0193114 A1 | 9/2005 | Colby | |
| 2005/0276262 A1 * | 12/2005 | Schuba | G06N 5/025 370/389 |
| 2006/0002319 A1 | 1/2006 | Lee | |
| 2008/0228932 A1 | 9/2008 | Monette et al. | |
| 2009/0182874 A1 | 7/2009 | Morford et al. | |
| 2010/0008228 A1 | 1/2010 | Chakravorty | |
| 2010/0235877 A1 * | 9/2010 | Hu | H04L 63/0227 726/1 |
| 2010/0315950 A1 * | 12/2010 | Venkataraman | H04L 43/0882 370/235 |
| 2012/0007743 A1 * | 1/2012 | Solomon | G01M 3/243 340/605 |
| 2012/0079092 A1 | 3/2012 | Woxblom et al. | |
| 2013/0188554 A1 * | 7/2013 | Cai | H04M 15/65 370/328 |
| 2014/0047351 A1 * | 2/2014 | Cui | G06Q 10/06 715/744 |
| 2014/0100925 A1 * | 4/2014 | Popescu | G06Q 30/01 705/14.4 |
| 2014/0189050 A1 | 7/2014 | Rijsman | |

OTHER PUBLICATIONS

M. Bjorklund, Ed., "YANG-A Data Modeling Language for the Network Configuration Protocol (NETCONF)", IETF RFC 6020, http://datatracker.ietf.org/doc/rfc6020/, Oct. 2010, 173 pages.

Co-pending U.S. Appl. No. 13/955,945 entitled "Remotely Updating Routing Tables", by Rijsman et al., filed Jul. 31, 2013, 42 pages.

* cited by examiner

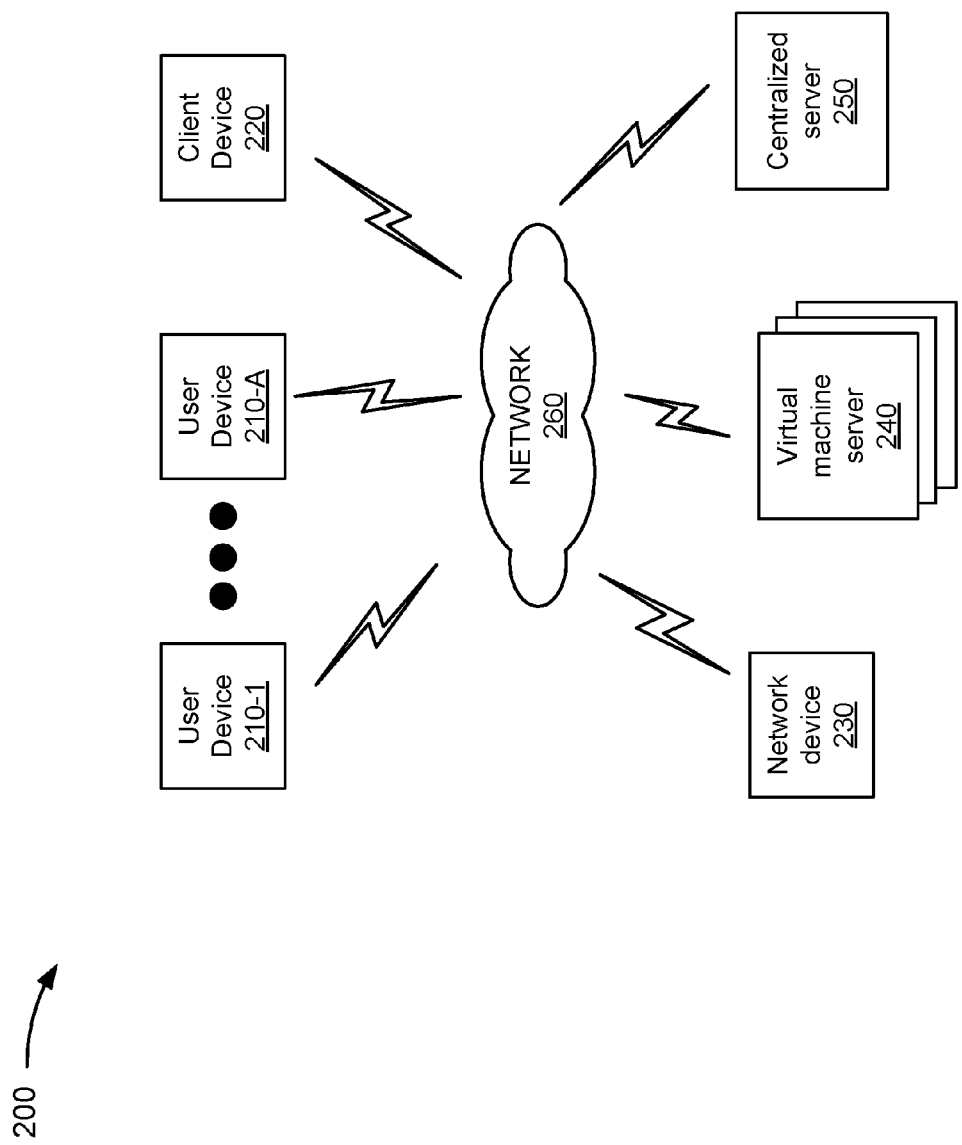

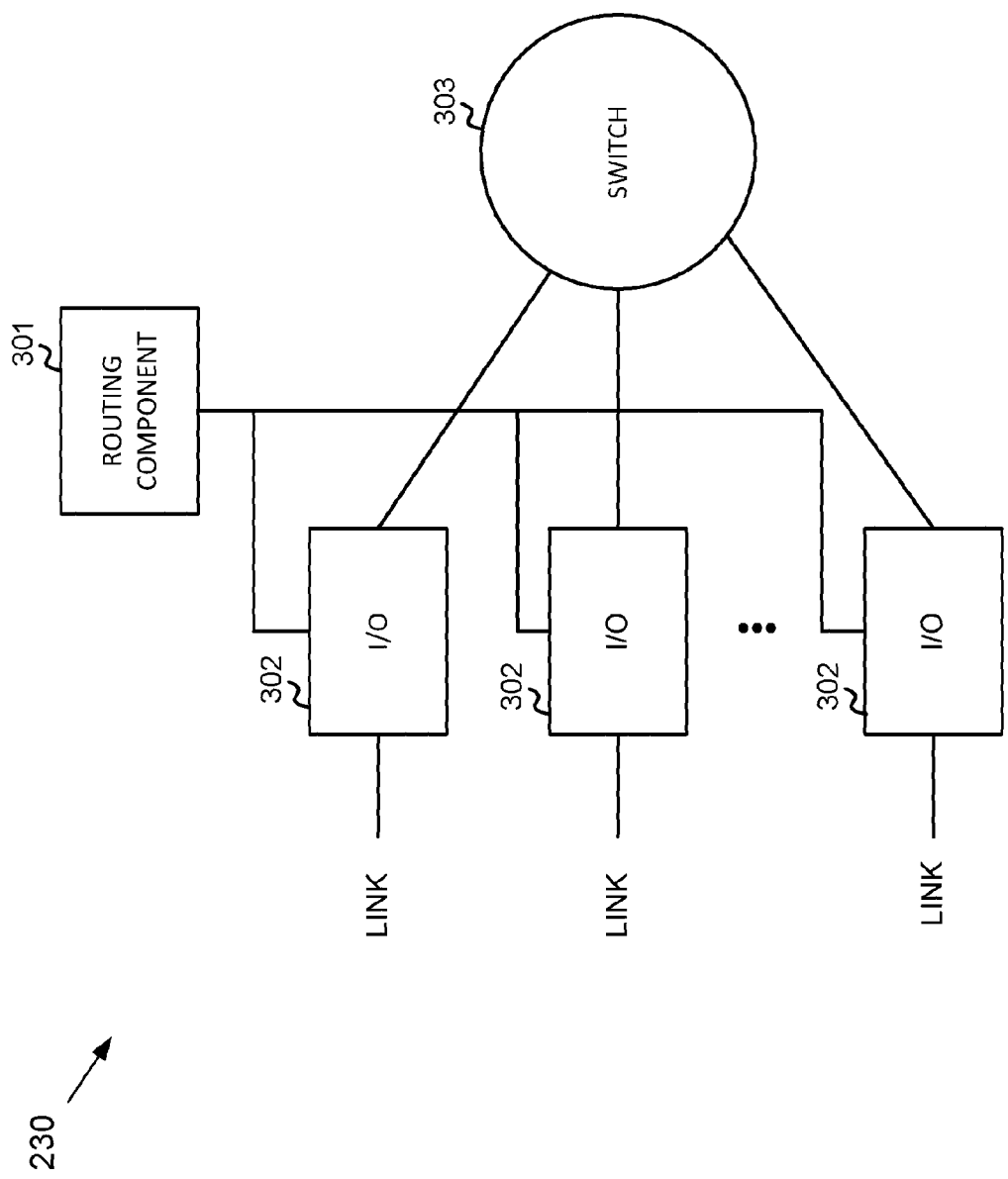

DYNAMIC NETWORK DEVICE PROCESSING USING EXTERNAL COMPONENTS

RELATED APPLICATIONS

This application is a continuation of U.S. patent application Ser. No. 14/617,384, filed Feb. 9, 2015 (now U.S. Pat. No. 9,258,384), which is a continuation of U.S. patent application Ser. No. 13/740,781, filed Jan. 14, 2013 (now U.S. Pat. No. 8,954,535), which claims priority under 35 U.S.C. §119 based on U.S. Provisional Patent Application No. 61/747,930, filed Dec. 31, 2012, the disclosures of which are incorporated by reference herein in their entireties.

BACKGROUND

Network devices, such as routers, are sometimes used to process, route, and provide services to data flows between user devices and server devices. Network devices sometimes include a wide area network (WAN) interface card (WIC). The WIC may include processing instructions, routing tables, or some other information that provide the network device with instructions for processing data flows. Modifying the functionality and/or operations of network devices (e.g., modifying the processing instructions, etc.) may require replacement of WAN cards and/or specialized software development.

SUMMARY

According to one example implementation, a method may include receiving, by a network device, information regarding a service set. The service set may identify a service to apply to a data flow received via a particular interface of the network device. The method may further include receiving, by the network device, the data flow via the particular interface; identifying, by the network device, a service to apply to the data flow based on the information regarding the service set, and identifying, by the network device, a processing device to process the data flow. The processing device may be different than the network device. The method may further include providing, by the network device, the data flow to the processing device. The processing device may process the data flow, on behalf of the network device, to form a processed data flow. The processed data flow may include the data flow with the service applied to the data flow. The method may further include receiving, by the network device, the processed data flow from the processing device, and transmitting, by the network device, the processed data flow to a destination device.

According to another example implementation, a network device may receive information regarding a service set. The service set may include an identifier to identify a service to apply to a data flow received via a particular interface of the network device. The network device may further receive the data flow via the particular interface, identify a service to apply to the data flow based on the information regarding the service set, add metadata, that may include the identifier, to the data flow, and identify a processing device to process the data flow. The processing device may be different than the network device. The network device may further provide the data flow to the processing device. The processing device may identify the service based on the identifier included in the metadata and processing the data flow, on behalf of the network device, to form a processed data flow. The processed data flow may include the data flow with the service applied to the data flow. The network device may further receive the processed data flow from the processing device and transmit the processed data flow to a destination device.

According to another example implementation, a computer-readable medium for storing instructions, may include instructions having: multiple instructions which, when executed by one or more processors associated with a network device, cause the one or more processors to receive information regarding a service set identifying a service to apply to a data flow received via a particular interface of the network device, receive the data flow via the particular interface, identify a service to provide to the data flow based on the information regarding the service set, and identify a virtual machine, of multiple virtual machines, to process the data flow. The virtual machine may be different than the network device. The multiple instructions may further cause the one or more processors to provide the data flow to the virtual machine. The virtual machine may identify the service based on the service set identifier and may process the data flow, on behalf of the network device and in, to form a processed data flow. The processed data flow may include the data flow with the service applied to the data flow. The multiple instructions may further cause the one or more processors to receive the processed data flow from the virtual machine; and provide the processed data flow to a destination device.

BRIEF DESCRIPTION OF THE DRAWINGS

FIG. 2 illustrates an example environment in which systems and/or methods, described herein, may be implemented;

FIG. 3A illustrates example components of a network device;

DETAILED DESCRIPTION

The following detailed description refers to the accompanying drawings. The same reference numbers in different drawings may identify the same or similar elements.

Systems and/or methods, as described herein, may permit processes, applications, and/or services of a network device (e.g., a router, a switch, a gateway, or some other network device) to occur outside of the network device. For example, a virtual machine may execute applications that modify a control plane of the network device (e.g., modify routing tables of the network device, install firewall filters on the network device, etc.). Additionally, or alternatively, the virtual machine may process a data flow on behalf of the network device to allow the network device to provide a service to the data flow (e.g., a firewall service, a network address translation (NAT) service, a wide area network (WAN) optimization service, a hypertext transfer protocol (HTTP) header rewriting service, a compression service, a load balancing service, or some other type of service). In some implementations, a client device may provide, to a virtual machine and a network device, a service set or an application to direct the virtual machine to modify the control plane of the network device. In some implementations, the service set may instruct the network device to provide a particular service to a particular data flow and to steer the particular data flow to a particular virtual machine such that the particular data flow may receive the service. In some implementations, service set may instruct the virtual machine to apply the particular service to the particular data flow. As a result, the functionality and/or operations of the network device may be modified without the need to modify the network device itself.

Figure 1:
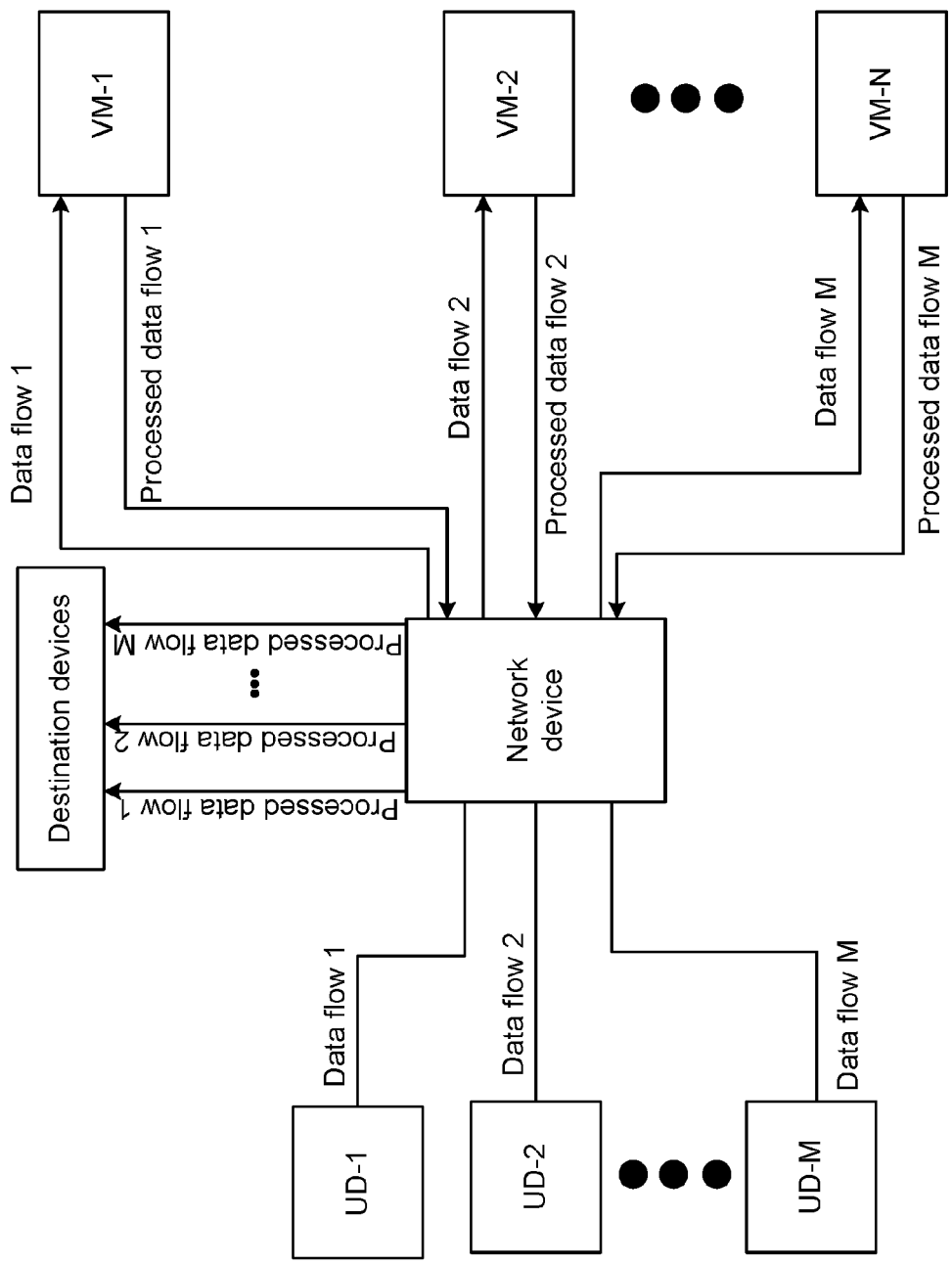
FIG. 1 illustrates an example overview of an implementation described herein.

FIG. 1 illustrates an example implementation as described herein. As shown in FIG. 1, a network device may receive a first data flow (e.g., data flow 1) from a first user device (e.g., UD-1) via a first interface of the network device. The network device may identify a particular virtual machine (e.g., VM-1) with which to communicate (e.g., based on the interface) in order to receive processing support to allow the network device to provide a service to the first data flow. As further shown in FIG. 1, the network device may route a data flow to a virtual machine. The virtual machine may process the data flow on behalf of the network device to form a processed data flow (e.g., a data flow with a service applied to the data flow). In some implementations, the network device may provide the processed data flow to a destination device. In some implementations, the network device may receive multiple data flows (e.g., data flows 1 through M, where M≥2) and communicate with multiple virtual machines (e.g., VM-1 through VM-N, where N≥2) in order to provide services to the multiple data flows (e.g., data flow 1 through data flow M).

In some implementations, the network device may identify a service to provide to a data flow (and a virtual machine with which to communicate in order to process the data flow to provide the service) based on information associated with a service set. A service set may include information that identifies an interface of the network device, a service to provide to data flows received via the interface, and a virtual machine to communicate with in order to process the data flow and provide the service to the data flow.

As described above, the virtual machines may execute an application to modify a control plane of the network device. For example, the virtual machines may modify the control plane of the network device to direct the network device to route particular data flows in a particular manner (e.g., route some data flows to particular virtual machines for processing, block some other data flows, etc.).

Because virtual machines may be used to process data flows on behalf of a network device, or to modify the control plane of the network device, the network device may be capable of providing any number of services to any number of data flows by communicating with the virtual machines over a common infrastructure. Further, the virtual machines may be stored by servers located in various geographic locations.

While the systems and/or methods are described in terms of a network device communicating with virtual machines, in practice, the network device may communicate with physical servers, WAN cards, containers (e.g., Linux containers), or some other device for processor support and/or for network device control plane modification.

FIG. 2 is a diagram of an example environment 200 in which systems and/or methods described herein may be implemented. As shown in FIG. 2, environment 200 may include user device 210-1, . . . , 210-A (where A≥1), client device 220, network device 230, virtual machine server(s) 240, centralized server 250, and network 260.

User device 210 may include a device capable of communicating via a network, such as network 260. For example, user device 210 may correspond to a mobile communication device (e.g., a smart phone or a personal digital assistant (PDA)), a portable computer device (e.g., a laptop or a tablet computer), a gaming device, a desktop computer, a server, or some other type of computing device.

Client device 220 may include a computing device or a collection of computing devices. In some implementations, client device 220 may be used to develop a service set that directs network device 230 to communicate with a virtual machine stored by virtual machine server 240 (e.g., for processing support to allow network device 230 to provide a service to a data flow). Additionally, or alternatively, client device 220 may be used to develop an application which virtual machine server 240 may execute to modify a control plane of network device 230. In some implementations, client device 220 may provide, to network device 230 or centralized server 250, a service set or an application.

Network device 230 may include a network routing device or a collection of network routing devices. In some implementations, network device 230 may include a router, a switch, a gateway, an access point, or some other type of network device. In some implementations, network device 230 may receive data flows, and may process data flows in accordance with parameters specified in a service set. In some implementations, network device 230 may include a physical routing device and/or a virtual routing device (e.g., a virtual image stored by a server to function as a physical routing device).

Virtual machine server 240 may include a computing device, such as a server device, or a collection of service devices. In some implementations, virtual machine server 240 may implement a virtual machine that may provide a service to a data flow by functioning as a processing device to provide processing support to network device 230 (e.g., to allow network device 230 to provide a service to a data flow, in accordance with a service set). Additionally, or alternatively, virtual machine server 240 may implement a virtual machine that may execute an application to modify a control plane of network device 230. In some implementations, environment 200 may include multiple virtual machine servers 240, which may be provided as part of a data center. For example, the data center may connect multiple virtual machine servers 240 such that services provided by the multiple virtual machine servers 240 may be pooled together and such that the services provided by the multiple virtual machine servers 240 may be readily accessible by network device 230. In some implementations, each virtual machine server 240 may implement multiple virtual machines from which network device 230 may select in order to provide a service to a data flow.

In some implementations, virtual machine server 240 may provide an active service and/or a passive service to a data flow. For example, in an active service, virtual machine server 240 may modify, drop, or insert packets in the data flow. In a passive service, for example, virtual machine server 240 may monitor the data flow and may not forward the data flow. In some implementations, a passive service may operate on a copy or a sample of the data flow.

In some implementations, a particular virtual machine implemented by virtual machine server 240 may opt-out of providing a particular service for a particular session or a particular portion of a session. For example, assume that virtual machine server 240 provides an HTTP service to an HTTP message and that virtual machine server 240 may provide the service to the HTTP message based on a header of an HTTP message. Further assume that the header of the HTTP message is received by virtual machine server 240 via a first portion of a session, and that a body of the HTTP message is received by virtual machine server 240 via a second portion of the session. Given these assumptions, virtual machine server 240 may opt-out of providing the HTTP service for the second portion of the session since virtual machine server 240 may provide the HTTP service to the HTTP message based on the header of the HTTP message and may not be in need of the body of the HTTP message. In some implementations, service opt-out may result in a performance improvement by reducing the number of sessions or portions of a session in which a service is provided.

In some implementations, virtual machine server 240 may identify additional services to apply to different data flows on a per-flow basis. For example, virtual machine server 240 may perform a deep packet inspection service to a data flow, may identify a type of session associated with the data flow (e.g., a video type session), and may identify an additional service to apply to the data flow based on the type of session. For a video type session, for example, virtual machine server 240 may provide a caching service, whereas for another type of session in another data flow, virtual machine server 240 may provide some other service (e.g., an intrusion detection service, or some other service). As a result, different data flows may be directed to different virtual machines implemented by virtual machine server 240.

Centralized server 250 may include a computing device, such as a server device or a collection of service devices. In some implementations, centralized server 250 may store service sets and/or applications provided by client device 220. Centralized server 250 may provision network device 230 to direct network device 230 to provide a service to a data flow (e.g., based on information associated with a service set). Alternatively, network device 230 may receive a service set from centralized server 250 or client device 220 and may identify a service to provide to a data flow based on the service set. In some implementations, centralized server 250 may generate virtual machines, implemented by virtual machine server(s) 240, based on information in a service set. Centralized server 250 may also function as a directory server to broadcast information regarding virtual machines which network device 230 may discover.

Network 260 may include one or more wired and/or wireless networks. For example, network 260 may include a cellular network, a public land mobile network (PLMN), a second generation (2G) network, a third generation (3G) network, a fourth generation (4G) network, a fifth generation (5G) network, and/or another network. Additionally, or alternatively, network 260 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3A illustrates example components of network device 230. As shown in FIG. 3A, network device 230 may include routing component 301, input/output (I/O) components 302, and switch 303.

Routing component 301 may include a routing processor or a collection of routing processors. In some implementations, routing component 301 may perform a high level management function for network device 230. For example, routing component 301 may communicate with networks and/or systems connected to network device 230 to exchange information regarding network topology. In some implementations, routing component 301 may generate routing tables based on network topology information, may generate forwarding tables based on the routing tables, and may send the forwarding tables to I/O components 302. In some implementations, routing component 310 may perform other general control and monitoring functions for network device 230.

I/O component 302 may include an interface device or a collection of interface devices. In some implementations, I/O component 302 may connect to routing component 301 and switch 303. In some implementations, I/O component 302 may receive packets on physical links connected to a network. Each physical link could be one of many types of transport media, such as optical fiber or Ethernet cable. The packets on the physical link may be formatted according to one of several protocols, such as the synchronous optical network (SONET) standard or Ethernet. In some implementations, I/O component 302 may use forwarding tables to perform route lookup for incoming data flows.

Switch 303 may include one or more switching planes to facilitate communication between two or more of I/O components 302. In some implementations, switch 303 may include a single or multi-stage switch fabric.

Figure 3B:
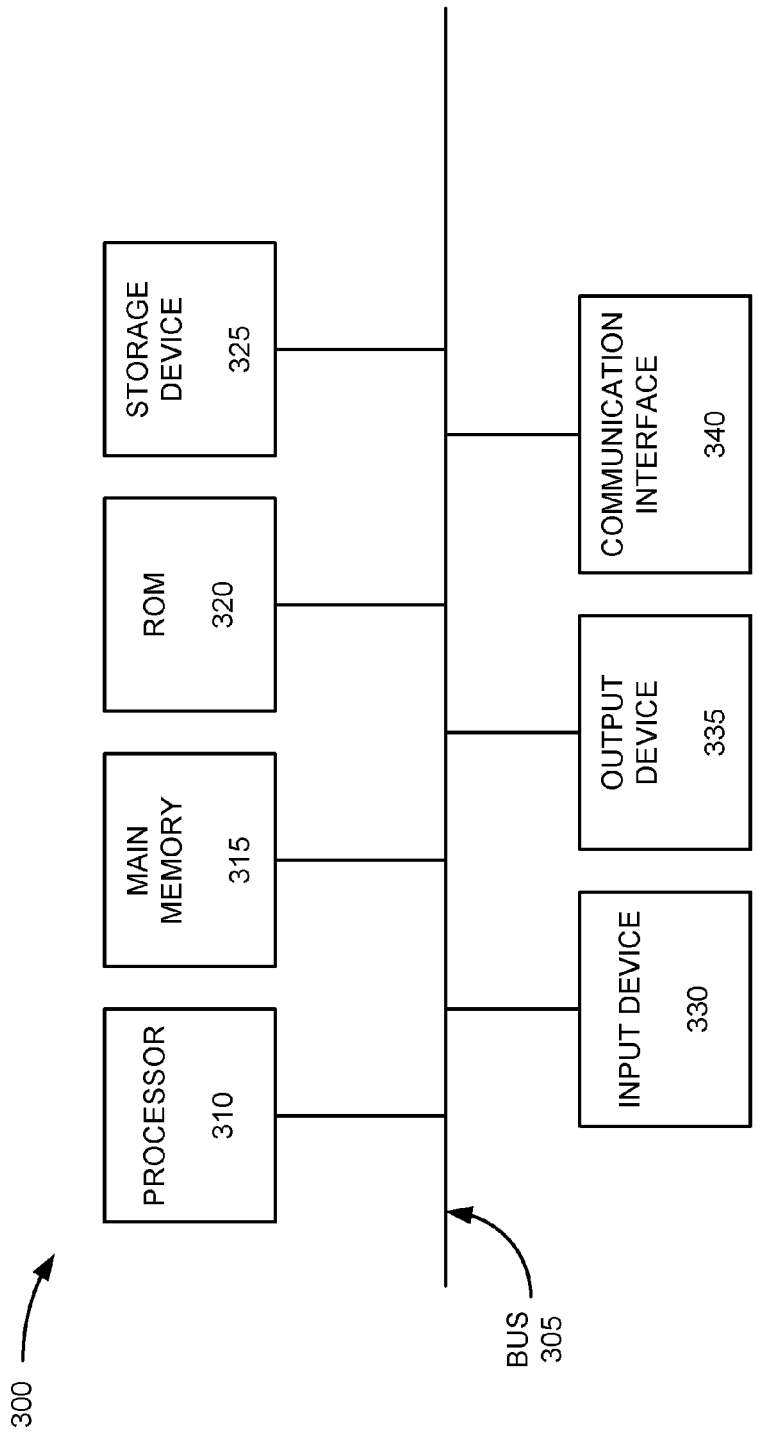
FIG. 3B illustrates example components of a device that may be used within the environment of FIG. 2.

FIG. 3B illustrates example components of a device 300 that may be used within environment 200 of FIG. 2. Device 300 may correspond to user device 210, client device 220, virtual machine server 240, or centralized server 250. Each of user device 210, client device 220, virtual machine server 240, or centralized server 250 may include one or more devices 300 and/or one or more components of device 300.

As shown in FIG. 3B, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
FIG. 4 illustrates an example data structure that may be stored by one or more devices in the environment of FIG. 2.

FIG. 4 illustrates an example data structure 400 that may be stored by one or more devices in environment 200, such as client device 220, network device 230, virtual machine server 240, or centralized server 250. In one implementation, data structure 400 may be stored in a memory of client device 220, network device 230, virtual machine server 240, or centralized server 250. In another implementation, data structure 400 may be stored in a memory separate from, but accessible by, client device 220, network device 230, virtual machine server 240, or centralized server 250. In some implementations, a portion of data structure 400 may be stored by a device in environment 200, and another portion of data structure 400 may be stored by another device in environment 200.

As shown in FIG. 4, data structure 400 may include interface information field 410, service set ID field 420, service parameters field 430, and virtual machine information field 440.

Interface information field 410 may identify information associated with an interface of network device 230. For example, interface information field 410 may identify an interface identifier (ID), a filter, and a data flow direction (e.g., an inbound or outbound direction). In some implementations, the interface ID field may store a string of characters to identify an interface of network device 230 (e.g., an Ethernet interface, a frame relay interface, a serial interface, a SONET interface, or some other type of interface). Additionally, or alternatively, the interface ID may correspond to a port identifier, or some other identifier that identifies the interface of network device 230 via which network device 230 may receive a data flow.

In some implementations, a particular interface may be associated with a particular group of user devices 210 (e.g., a group of user devices 210 subscribed to a service with a network service provider). That is, network device 230 may receive, via a first interface, a data flow from a user device 210 that is part of a first group of user devices 210. Similarly, network device 230 may receive, via a second interface, a data flow from another user device 210 that is part of a second group of user devices 210. As described above, a service set may identify services to provide to data flows based on data received via a particular interface of network device 230. Thus, network device 230 may provide a first service to data flows received from a first group of user devices 210 and a second service to data flows received from a second group of user devices 210.

In some implementations, network device 230 may determine a service to provide to a data flow that is received via a particular interface and that satisfies a particular filter. Network device 230 may also determine particular service parameters to provide to the data flow (e.g., particular rules for a firewall service, particular address pools for a NAT service, etc.). Further, network device 230 may determine a service set to provide to a data flow based on the direction of the data flow (e.g., inbound or outbound directions). The inbound/outbound field may store information that identifies the direction of a data flow associated with a particular service set. For example, network device 230 may identify a service to provide to the data flow depending on whether the data flow is an inbound data flow or an outbound data flow. In some implementations, the inbound direction may relate to a data flow that is to be received by network device 230. The outbound direction may relate to a data flow that is to be sent by network device 230.

The filter field may identify a filter criteria for a data flow received via a particular interface (e.g., as identified by the interface ID). In some implementations, a network device 230 may use a filter to select a particular data flow by inspecting contents of packets associated with the data flow. In some implementations, the filter may direct network device 230 to select a data flow based on information stored by the filter field. For example, the filter field may identify an internet protocol (IP) address, a hardware ID, a customer ID, or some other identifier, associated with a data flow.

As an example, assume that the filter field stores two IP addresses, such as "172.25.14.4" and "174.23.6.52." Further, assume that network device 230 receives two data flows via an interface corresponding to the interface ID of "4896." Further, assume that the two data flows received by network device 230 are associated with the IP addresses "172.25.14.4" and "555.23.6.52," respectively. Network device 230 may provide a service to the data flow associated with the IP address "172.25.14.4" and may not provide the service to the data flow associated with the IP address "555.23.6.52." In some implementations, the filter field may store a white list (e.g., a list of IP addresses, or some other identifier associated with a data flow, to identify data flows to which network device 230 may provide a service) or a black list (e.g., a list of IP addresses, or some other identifier associated with a data flow, to identify data flows to which network device 230 may not provide a service).

In some implementations, the filter may be stateless. For example, the filter may direct network device 230 to select a data flow based on individual packets associated with the data flow. Alternatively, the filter may be stateful. For example, the filter may direct network device 230 to select a data flow based on previously received packets.

Service set ID field 420 may store a string of characters to uniquely identify a service set associated with a particular interface, a particular filter, and a particular data flow direction. As shown in FIG. 4, the service set having the service set ID 123 may be associated with the data flows received via interface ID 5844 in the inbound direction. Thus, network device 230 may identify service set ID 123 when processing data flows received via interface ID 5844 in the inbound direction. In some implementations, service set ID may be generated when a new service set is received by network device 230 or centralized server 250. In some implementations, (e.g., when the service set ID is a number) the generated service set ID may be the next number after the most recently used service set ID.

As another example, assume that the service set having the service set ID 584 is associated with the data flows received via interface ID 4896 in the inbound or outbound direction. Further, assume that a filter (e.g., a white list or black list of IP addresses) is associated with the service set ID 584. Thus, network device 230 may identify service set ID 584 when processing data flows received via interface ID 4896 in the inbound direction or outbound direction and satisfying the filter.

Service parameters field 430 may store information identifying a set of rules, instructions, processes, functions, or some other information associated with a particular service set. In some implementations, information stored by service parameters field 430 may correspond to a service to provide to a data flow. For example, as shown in FIG. 4, service parameters field 430 may store information that directs network device 230 to provide a firewall service to data flows associated with service set ID 123 (e.g., data flows received via interface ID 5844 in the inbound direction). Further, service parameters field 430 may store particular parameters, associated with the service, such as particular routing operations, a list of IP addresses, a list of NAT rules, or some other parameters associated with the service. In some implementations, service parameters field 430 may store multiple service parameters for a single service set.

Virtual machine information field 440 may store information to identify a particular virtual machine with which network device 230 may communicate in order to provide a service to a data flow. For example, virtual machine information field 440 may store a virtual machine ID (VM ID), a server ID (e.g., an identifier associated with a particular virtual machine server 240), an IP address of the virtual machine and/or of virtual machine server 240, and/or some other information identifying a virtual machine. In some implementations, virtual machine information field 440 may not store information for a particular virtual machine, and may store information, such as "Auto-select" to direct network device 230 to perform an auto-select function to identify an available virtual machine to communicate with.

While particular fields are shown in a particular format in data structure 400, in practice, data structure 400 may include additional fields, fewer fields, different fields, or differently arranged fields than are shown in FIG. 4.

Figure 5:
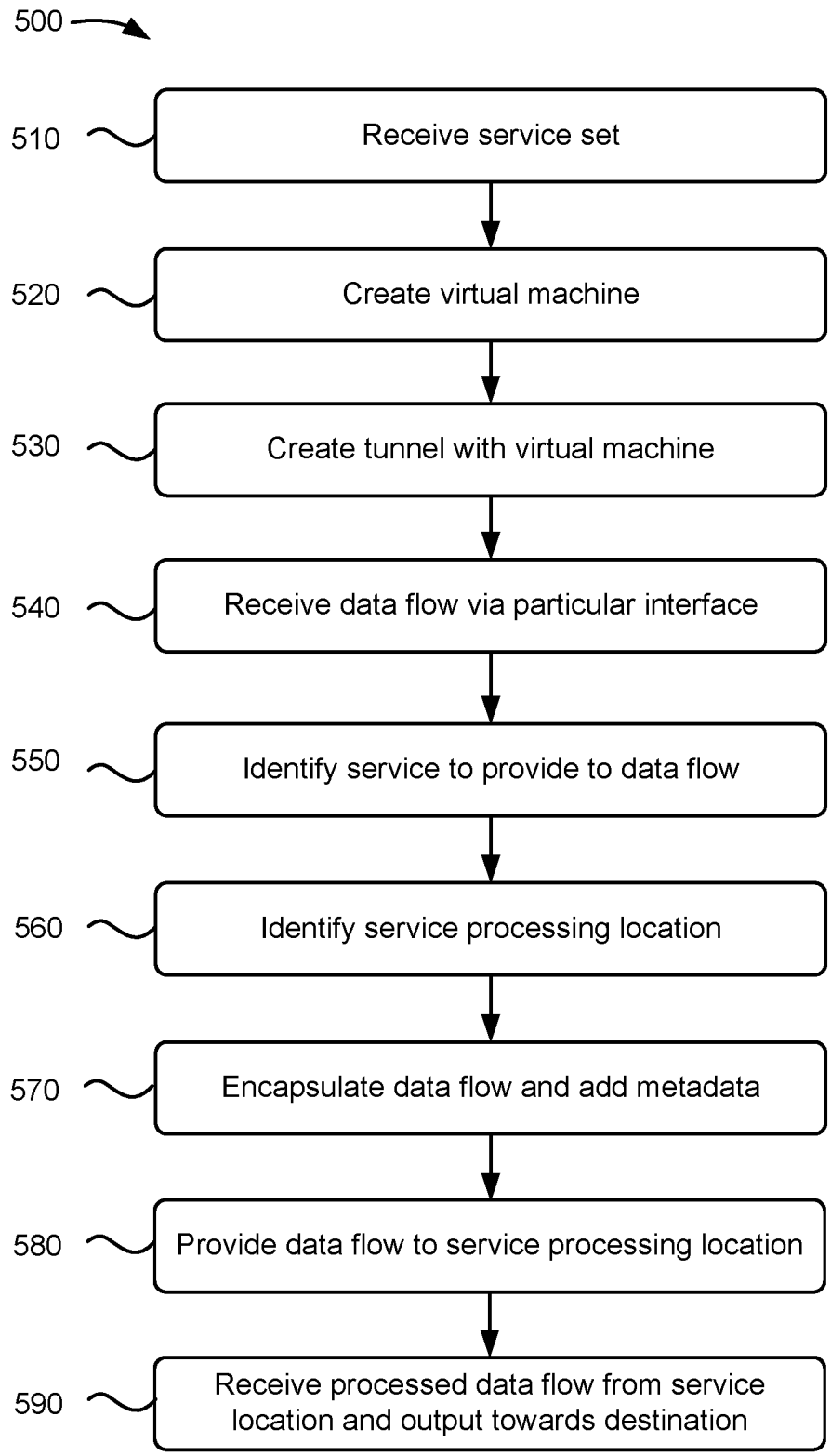
FIG. 5 illustrates a flowchart of an example process for processing data flow using virtual machines.

FIG. 5 illustrates a flowchart of an example process for processing data flow using virtual machines. In one implementation, process 500 may be performed by one or more components of network device 230. In another implementation, some or all of blocks of process 500 may be performed by one or more components of another device in environment 200 (e.g., virtual machine server 240 or centralized server 250), or a group of devices including or excluding network device 230.

As shown in FIG. 5, process 500 may include receiving a service set (block 510). In one implementation network device 230 may receive a service set from client device 220 (e.g., via a user interface of network device 230). For example, client device 220 may be used to develop a service set and install the service set on network device 230. In another implementation centralized server 250 may receive the service set from client device 220. In this case, centralized server 250 may provide the service set to network device 230. For example, centralized server 250 may install the service set on network device 230 based on a priority policy installed on network device 230 by client device 220.

Process 500 may also include creating a virtual machine (block 520). In one implementation, network device 230 may use a signaling protocol and/or a control plane protocol to instruct virtual machine server 240 to create the virtual machine in accordance with information associated with the service set. For example, network device 230 may identify a particular virtual machine server 240 and may instruct the identified virtual machine server 240 to create a virtual machine having a particular IP address, a particular identifier, a particular configuration, and/or having some other parameter. In some implementations, virtual machine server 240 may provide an indication to network device 230 that the virtual machine has been created. In another implementation, centralized server 250 may create the virtual machine (e.g., in a similar manner as described above). In this case, centralized server 250 may broadcast an indication that a virtual machine has been created, such that network device 230 may discover the newly created virtual machine.

Process 500 may also include creating a tunnel with the virtual machine (block 530). For example, network device 230 may use a control plane protocol to create a tunnel between network device 230 and the virtual machine. In some implementations, the tunnel may permit network device 230 to provide the virtual machine with a data flow for processing in a manner that prevents the data flow from being routed to an original destination of the processed data flow or an unintended location. Further, the tunnel may facilitate the transmission of the data flow when an intermediate router or switch may not identify the virtual machine. In some implementations, network device 230 may automatically create the tunnel when network device 230 creates the virtual machine, or when network device 230 discovers the virtual machine. As a result, a tunnel may be automatically established when the virtual machine is created such that the tunnel may be readily available to transfer a data flow to the virtual machine.

Process 500 may further include receiving a data flow via a particular interface (block 540). For example, network device 230 may receive a data flow from user device 210 via a particular interface (e.g., an Ethernet interface, a logic relay interface, a particular port of network device 230, etc.). As described above, the particular interface may be associated with a particular group of user devices 210 (e.g., a group of user devices 210 subscribed to a service with a network service provider).

Process 500 may also include identifying a service to provide to data flow (block 550). For example, network device 230 may identify a service to provide to the data flow based on information, such as information stored by data structure 400. In some implementations, network device 230 may receive a data flow via a particular interface, and may apply filters to the data flow to determine the service to provide to the data flow (e.g., as described above with respect to FIG. 4). In some implementations, network device 230 may determine a processing demand associated with the identified service.

Process 500 may further include identifying a service processing location (block 560). For example, network device 230 may identify a service processing location (e.g., a particular virtual machine implemented by a particular virtual machine server 240) based on information, such as information stored by data structure 400. As described above, the service processing location may be identified based on a virtual machine ID, a server ID, an IP address, or some other identifier. Alternatively, network device 230 may initiate an auto-selection function to automatically identify a service processing location. For example, network device 230 may identify virtual machines that provide the identified service and may select one of these virtual machines that has processing capacity (e.g., the least loaded virtual machine) to satisfy the processing demand associated with the identified service. In some implementations, network device 230 may instruct virtual machine server 240 to generate a virtual machine in a situation where a virtual machine having sufficient processing capacity is not available.

Alternatively, centralized server 250 may identify a service processing location and provide, to network device 230, information identifying the service processing location. For example centralized server 250 may identify virtual machines that provide the identified service and have processing capacity to satisfy the processing demand associated with the identified service. In some implementations, centralized server 250 may instruct virtual machine server 240 to generate a virtual machine in a situation where a virtual machine having sufficient processing capacity is not available.

Process 500 may also include encapsulating the data flow and adding metadata (block 570). For example, network device 230 may add a service set ID (e.g., metadata) to the data flow based on information, such as information stored by data structure 400. In some implementations, network device 230 may append the metadata such that the identified virtual machine may identify the service ID and corresponding service parameters associated with the service ID.

In some implementations, the metadata may include contextual information, such as an ID of an interface via which the data flow was received, an ID of a routing instance in which a data flow was a received, a subscriber or session ID associated with the data flow, or some other contextual information. Additionally, or alternatively, the metadata may include a scratch-pad to identify information to allow a particular virtual machine to communicate information to another virtual machine. Additionally, or alternatively, the metadata may include information to allow the network device to reinsert a packet, associated with the data flow, into a forwarding pipeline when the packet is processed by a virtual machine and received by network device 230. In some example implementations, the metadata may be 8, 16, or 32 bytes in size, or may be some other size.

In some implementations, network device 230 may encapsulate the data flow in a tunnel packet corresponding to the tunnel associated with the virtual machine server 240 corresponding to the service location. In some implementations, the tunnel packet may facilitate transmission of the data flow via the particular tunnel associated with the virtual machine server 240.

Process 500 may also include providing the data flow to the service processing location (block 580). For example, network device 230 may provide the data flow to the virtual machine server 240 identified in block 560. In some implementations, network device 230 may provide the data flow via the tunnel using the tunnel packet. For example, the tunnel packet may include information to identify an IP address of the virtual machine server 240. Network device 230 may look up the IP address in a routing table stored by network device 230 to identify an outbound interface via which to transmit the data flow (e.g., an interface associated with the tunnel). In some implementations, network device 230 may provide, to virtual machine server 240, instructions corresponding to the service ID (e.g., instructions that direct virtual machine server 240 how to process the data flow on behalf of network device 230). In some implementations, network device 230 may provide the instructions using a service set signaling protocol, or some other type of protocol. As an example, assume that the network device 230 determines a service set ID of "123" associated with the data flow, and that the service set ID "123" includes service parameters relating to a list of firewall rules. Given these assumptions, virtual machine server 240 may process the data flow, on behalf of network device 230, to form a processed data flow (e.g., data flow with a service applied to the data flow) having the list of firewall rules applied to the data flow.

Process 500 may further include receiving processed data flow from the service processing location and outputting towards a destination (block 590). For example, network device 230 may receive the processed data flow from virtual machine server 240 and may output the processed data flow towards a destination device (e.g., a particular user device 210 or a service device). As a result, network device 230 may provide a service to a received data flow by identifying a service, associated with the data flow (e.g., based on an interface via which the data flow is received, data flow direction, and/or one or more filters applied to the data flow), identifying a service location (e.g., a particular virtual machine server 240 implementing a particular virtual machine), appending a service ID to the data flow, and communicating with virtual machine server 240 to allow virtual machine server 240 to process the data flow and apply the service in accordance with service parameters corresponding to the service ID.

While a particular series of blocks has been described above with regard to FIG. 5, the operations, data flows, and/or the order of the blocks may be modified in other implementations. Further, non-dependent operations and/or data flows may be performed in parallel.

Figure 6A:
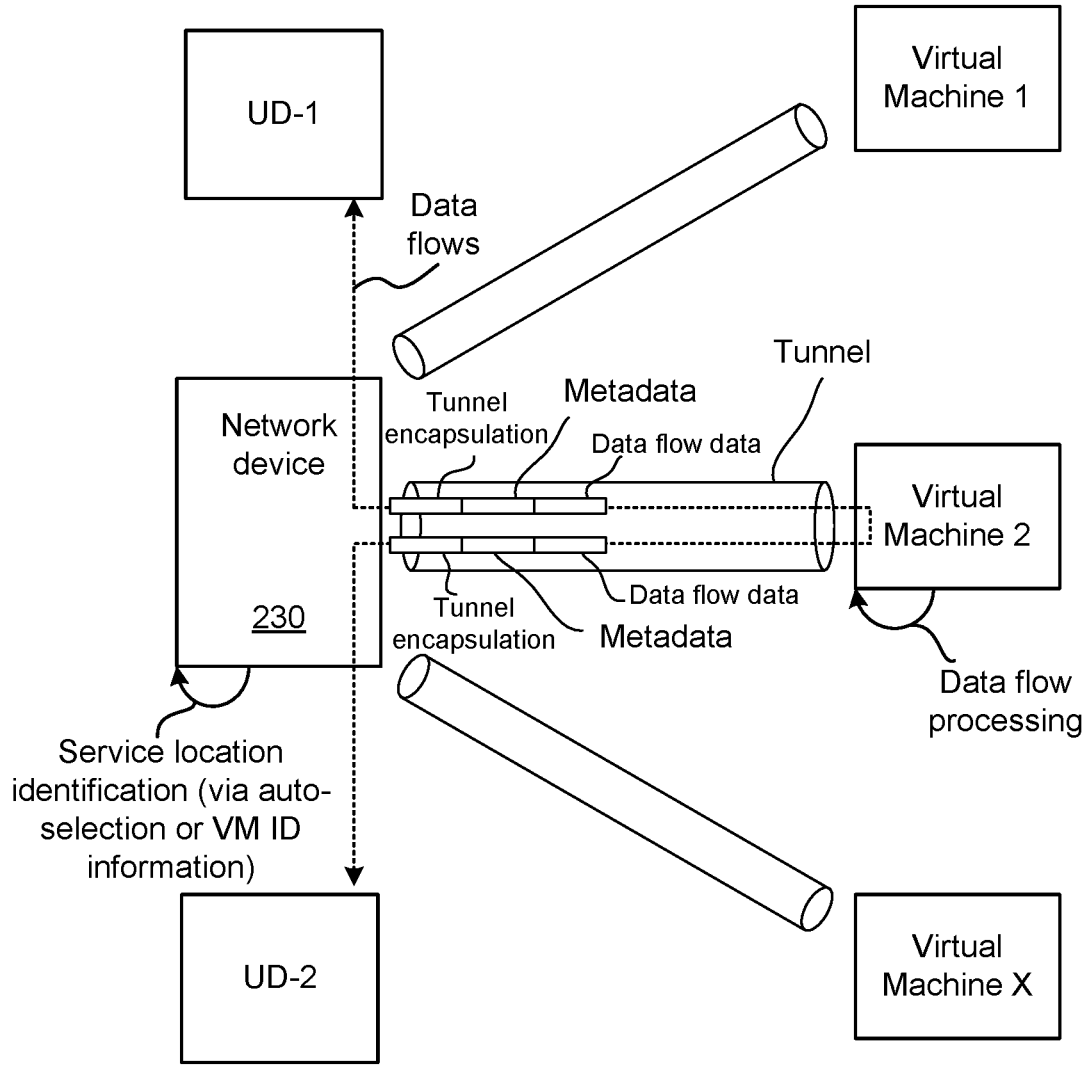
FIGS. 6A-6B and FIGS. 7-8 illustrate example implementations as described herein.

FIG. 6A illustrates an example implementation as described herein. In FIG. 6A, assume that two user devices 210 (e.g., UD-1 and UD-2) communicate with each other via network device 230. Further assume that network device 230 establishes tunnels with multiple virtual machines (e.g., virtual machine 1 through X, where X>1), as described above. In some implementations, network device 230 may receive data flows from UD-1 and/or UD-2 via a particular interface of network device 230. As described above, network device 230 may identify services and service locations associated with the data flows based on the interface via which the data flows are received and/or based on a filter.

As described above, network device 230 may identify a service location (e.g., a virtual machine) to send the data flow for processing. For example, network device 230 may perform an auto-selection function to identify a virtual machine that provides the identified services and has processing capacity to process the identified services. Alternatively, network device 230 may identify a virtual machine based on virtual machine ID information included in the service set. In FIG. 6A, assume that network device 230 identifies virtual machine 2 as the service location (e.g., by auto-selection or by virtual machine ID information included in the service set). Given this assumption, network device 230 may encapsulate the data flows in a tunnel, append metadata to the data flows (e.g., to identify a service set ID), and provide the data flows (e.g., via the tunnel) to virtual machine 2 for processing. In some implementations, virtual machine 2 may process the data flow, on behalf of network device 230, in accordance with service set parameters corresponding to the service set ID. As described above, and as shown in FIG. 6A, network device 230 may receive processed data flows and provide the processed data flows to respective user devices 210.

In some implementations, (e.g., when a processed data flow is received by network device 230 from a virtual machine), the processed data flow can be injected into a different routing instance (e.g., virtual routing and forwarding (VRF) or context or zone) than the routing instance in which the traffic flow was originally received by networking device 230. As a result, data flows may be processed when the virtual machine modifies a destination IP address of packets in the data flow (e.g. NAT).

Figure 6B:
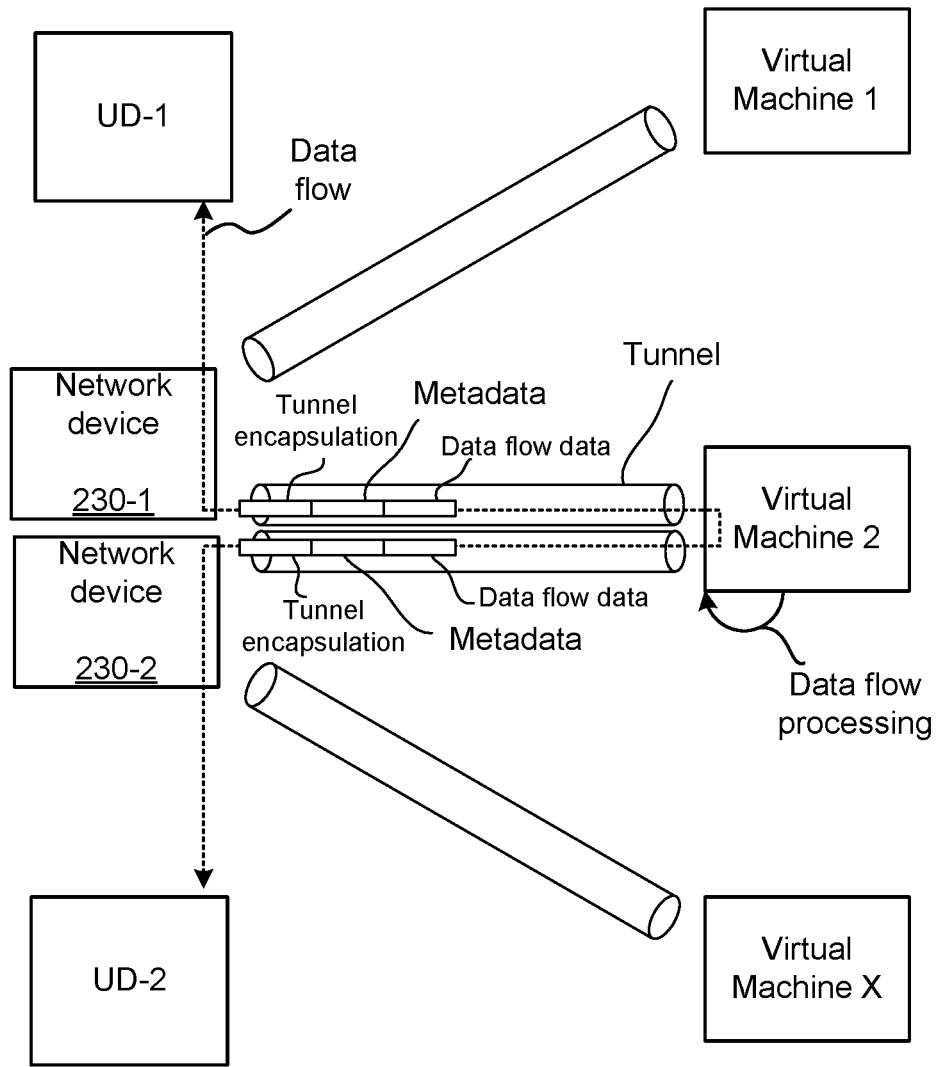

In some implementations, the service location (e.g. virtual machine 2) may provide the processed data flow to a different network device 230 from the network device 230 that the service location received the data flow. Referring to FIG. 6B, assume that a first network device 230 (e.g., network device 230-1) receives a data flow from UD-1 destined for UD-2. Further assume that network device 230-1 identifies virtual machine 2 as the service location. As shown in FIG. 6B, virtual machine 2 may process the data flow and provide the processed data flow to a second network device (e.g., network device 230-2). As shown in FIG. 6B, network device 230-2 may provide the processed data flow to a destination device (e.g., UD-2). In some implementations, the service location may identify where to send the processed data flow based on network devices 230 having capacity to provide the processed data flow to the destination device, based on network devices 230 that service the destination device and/or based on some other factor.

Figure 7:
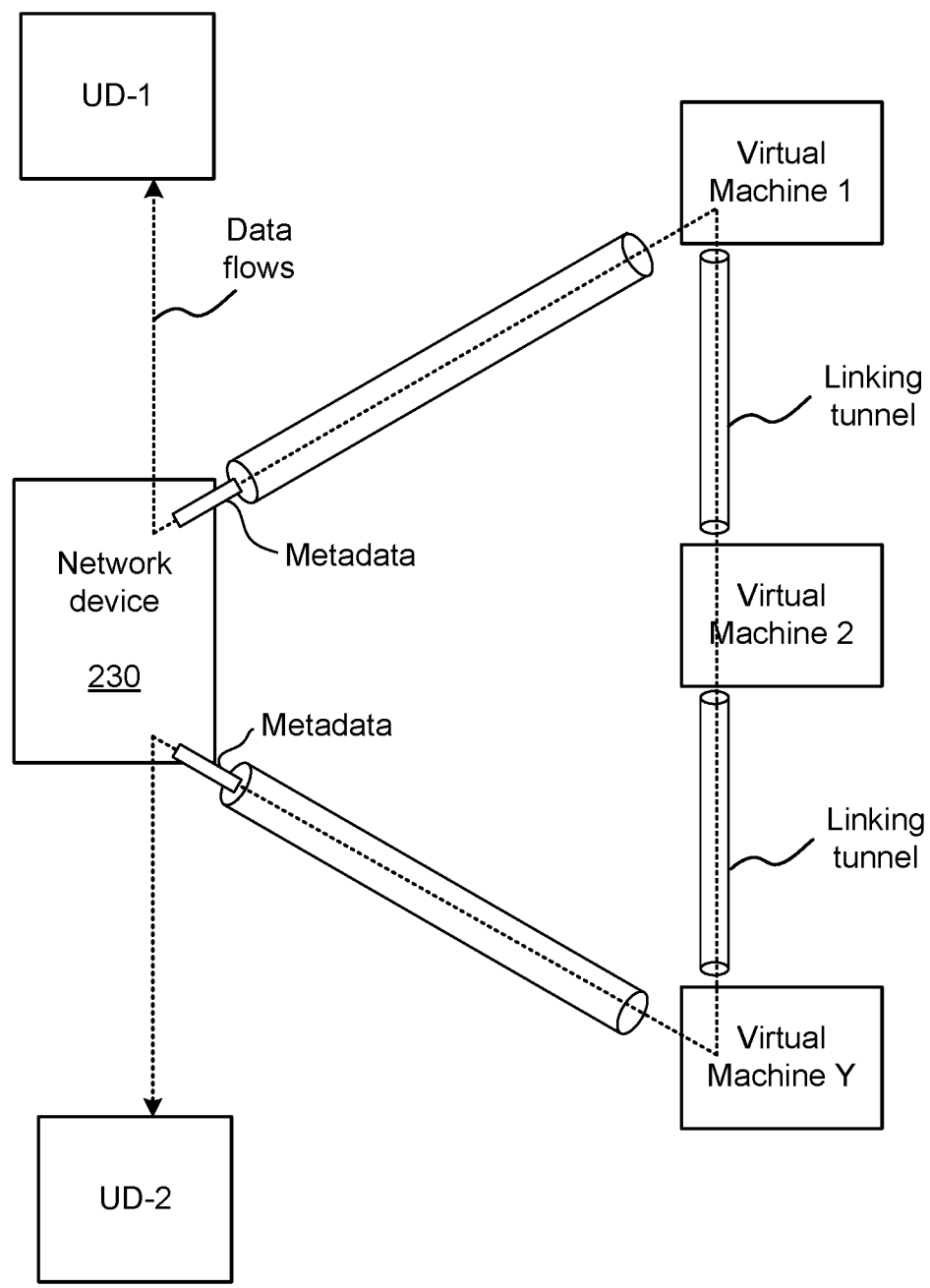

FIG. 7 illustrates an example implementation as described herein. FIG. 7 illustrates a linking of virtual machines to process data flows on behalf of network device 230. For example, multiple virtual machines (e.g., virtual machine 1 through Y (where Y>1)) may be linked together (e.g., via linking tunnels) to function as a single virtual machine. Similar to FIGS. 6A-6B, network device 230 may identify service sets for data flows based on an interface via which the data flows are received and/or based on a filter. Network device 230 may append metadata to the data flows, encapsulate the data flows in tunnel packets, send the data flows (e.g., via the tunnel packets) to the multiple virtual machines for processing, and provide processed data flows to respective user devices 210.

Figure 8:
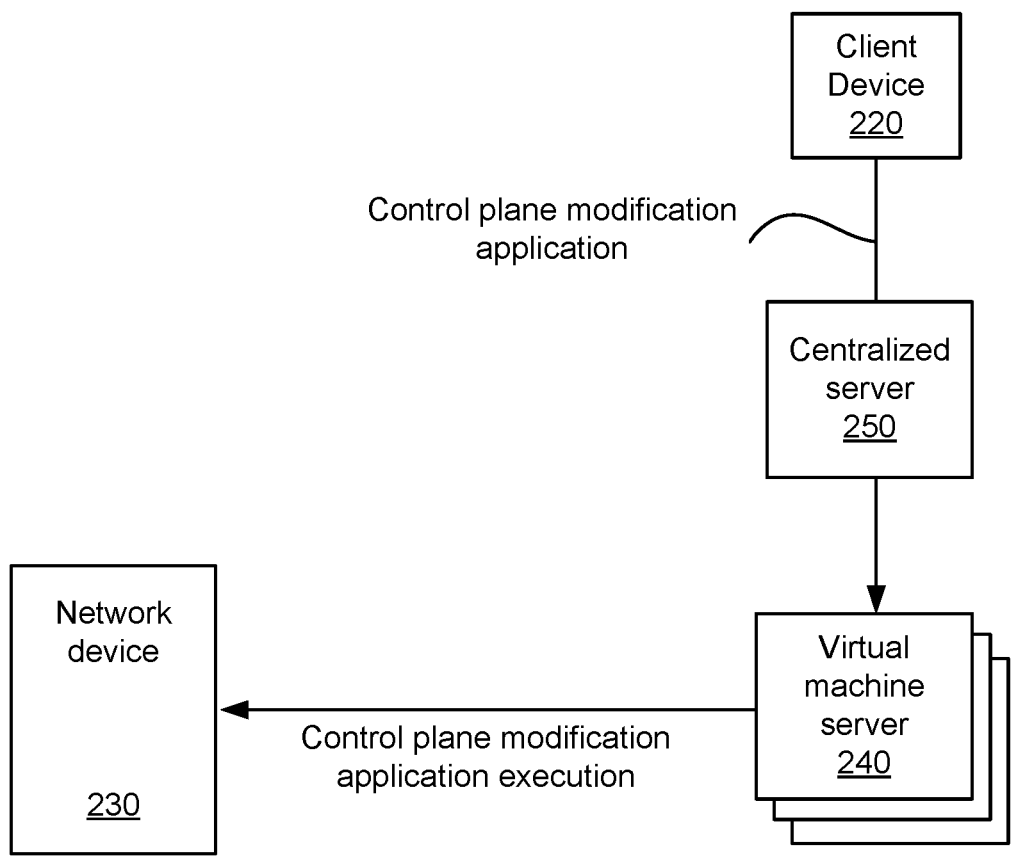

FIG. 8 illustrates an example implementation as described herein. As described above, client device 220 may be used to develop an application that virtual machine server 240 may execute to modify a control plane (e.g., a firewall filter, a routing table, etc.) of network device 230. In some implementations, client device 220 may provide a control plane modification application to virtual machine server 240. For example, client device 220 may provide the application to centralized server 250, and centralized server 250 may provide the application to virtual machine server 240 (e.g., by publishing the application in a manner that allows virtual machine server 240 to discover the application and request the application from centralized server 250). Alternatively, client device 220 may provide the application to virtual machine server 240 independently of centralized server 250. In some implementations, virtual machine server 240 may execute the application and may communicate with network device 230 to modify the control plane of network device 230 in accordance with the instructions of the application.

Some example applications may allow a virtual machine to install routes in a routing table of network device 230, install firewall filters/policies on network device 230 and associate the firewall filters/policies to interfaces on network device 230, retrieve a configuration from network device 230 and/or execute operational commands stored by network device 230, or allow the virtual machine to perform some other function or modify the control plane of network device 230 in some other manner. In some implementations, a Mobility Management Entity (MME), associated with a cellular network, may use a firewall application programming interface (API) to steer particular flows of MME control traffic to a particular virtual machine where a control plane modification application is located.

Because virtual machine server 240 may be used to process data flows on behalf of network device 230, or to modify the control plane of network device 230, network device 230 may be capable of providing any number of services to any number of data flows by communicating with one or more virtual machines implemented by one or more virtual machine servers 240 over a common infrastructure. Further, the virtual machines may be implemented by servers located in various geographic locations. As described above, virtual machine servers 240 may be provided as part of a data center such that services provided by virtual machine servers 240 may be readily accessible by network device 230.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive a data flow;
identify a service to provide to the data flow;
identify a service processing location toward which to provide the data flow for service processing, the service processing location being remote from
the device;
provide the data flow toward the service processing
location for service processing based on identifying
the service and the service processing location,
the service processing of the data flow forming a
processed data flow;
receive the processed data flow from the service processing location; and
provide the processed data flow toward a destination
device.

2. The device of claim 1, where the one or more processors are further to:
store a data structure that includes information associated
with identifying the service or identifying the service
processing location;
create the service processing location on another device
using one or more protocols; and
create a tunnel between the device and the service processing location,
the tunnel permitting the device to provide the data
flow toward the service processing location.

3. The device of claim 2, where the one or more processors, when identifying the service, are to:
identify the service using the data structure,
the data structure including a service identifier that
identifies the service.

4. The device of claim 2, where the one or more processors, when identifying the service processing location, are to:
identify the service processing location using the data
structure,
the data structure including:
a service processing location identifier that identifies
the service processing location, or
an instruction to automatically identify the service
processing location.

5. The device of claim 1, where the one or more processors are further to:
encapsulate the data flow in a tunnel packet in association
with providing the data flow toward the service processing location.

6. The device of claim 1, where the one or more processors, when receiving the processed data flow, are to:
receive the processed data flow via a second service
processing location.

7. The device of claim 1, where the service processing location is a virtual machine.

8. A non-transitory computer-readable medium storing instructions, the instructions comprising:
one or more instructions that, when executed by one or
more processors, cause the one or more processors to:
receive a data flow from a first device;
identify a service to provide to the data flow;
identify a second device for processing the data flow,
the second device being used by the first device to
process the data flow;
provide the data flow toward the second device, for
processing,
the processing enabling the first device to provide the
service to the data flow;
receive the data flow from the second device; and
provide the data flow toward a third device.

9. The non-transitory computer-readable medium of claim
8, where the one or more instructions, that cause the one or
more processors to identify the service, cause the one or
more processors to:
identify an interface associated with receiving the data
flow; and
identify the service based on identifying the interface.

10. The non-transitory computer-readable medium of
claim 8, where the one or more instructions, when executed
by the one or more processors, further cause the one or more
processors to:
receive a service set from a fourth device,
the service set identifying the service; and
where the one or more instructions, that cause the one or
more processors to identify the service, cause the one
or more processors to:
identify the service using the service set.

11. The non-transitory computer-readable medium of
claim 8, where the one or more instructions, that cause the
one or more processors to identify the second device, cause
the one or more processors to:
identify the second device based on identifying the service,
the service being associated with the second device.

12. The non-transitory computer-readable medium of
claim 8, where the one or more instructions, when executed
by the one or more processors, further cause the one or more
processors to:
instruct the second device to create a virtual machine
using one or more protocols; and
where the one or more instructions, that cause the one or
more processors to provide the data flow toward the
second device, cause the one or more processors to:
provide the data flow toward the second device for
processing by the virtual machine.

13. The non-transitory computer-readable medium of
claim 12, where the one or more protocols include:
a signaling protocol, or
a control plane protocol.

14. The non-transitory computer-readable medium of
claim 8, where the one or more instructions, when executed
by the one or more processors, further cause the one or more
processors to:
create a tunnel for providing the data flow toward the
second device; and
where the one or more instructions, that cause the one or
more processors to provide the data flow toward the
second device, cause the one or more processors to:
provide the data flow toward the second device using
the tunnel.

15. A method, comprising:
receiving, by a network device, one or more data flows;
identifying, by the network device, one or more services
to provide to the one or more data flows,
the one or more services being provided in association
with receiving the one or more data flows;
identifying, by the network device, one or more virtual
machines for processing the one or more data flows,
the one or more virtual machines being associated with
one or more devices different from the network
device;
providing, by the network device and to the one or more
virtual machines, the one or more data flows to create
one or more processed data flows;
receiving, by the network device, the one or more processed data flows from the one or more virtual
machines; and
providing, by the network device, the one or more processed data flows toward one or more destination
devices.

16. The method of claim 15, further comprising:
appending metadata to the one or more data flows,
the metadata being associated with the one or more services; and
where providing the one or more data flows to create the one or more processed data flows comprises:
providing the one or more data flows and the metadata to the one or more virtual machines.

17. The method of claim 15, where providing the one or more data flows to the one or more virtual machines comprises:
providing the one or more data flows to a first virtual machine, and
where receiving the one or more processed data flows comprises:
receiving the one or more processed data flows from a second virtual machine.

18. The method of claim 15, further comprising:
identifying one or more directions of the one or more data flows; and
where identifying the one or more services comprises:
identifying the one or more services based on identifying the one or more directions of the one or more data flows.

19. The method of claim 15, further comprising:
identifying one or more filters associated with the one or more data flows; and
where identifying the one or more services, comprises:
identifying the one or more services based on identifying the one or more filters.

20. The method of claim 15, further comprising:
encapsulating the one or more data flows; and
where providing the one or more data flows comprises:
providing the one or more data flows to the one or more virtual machines in association with encapsulating the one or more data flows.

* * * * *